United States Patent
Atreya et al.

(10) Patent No.: US 9,178,896 B2
(45) Date of Patent: Nov. 3, 2015

(54) ROGUE AP DETECTION

(71) Applicant: Avaya Inc., Basking Ridge, NJ (US)

(72) Inventors: Vivek L Atreya, Bangalore (IN); Ruth Tsai, Saratoga, CA (US); Seemant Choudhary, Fremont, CA (US); Shashi Hosakere Ankaiah, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 182 days.

(21) Appl. No.: 13/891,184

(22) Filed: May 9, 2013

(65) Prior Publication Data

US 2014/0334317 A1    Nov. 13, 2014

(51) Int. Cl.
| | |
|---|---|
| *H04W 40/00* | (2009.01) |
| *G06F 11/30* | (2006.01) |
| *H04L 29/06* | (2006.01) |
| *H04W 12/08* | (2009.01) |
| *H04W 12/12* | (2009.01) |
| *H04W 88/08* | (2009.01) |

(52) U.S. Cl.
CPC ............ *H04L 63/14* (2013.01); *H04L 63/1416* (2013.01); *H04L 63/1441* (2013.01); *H04W 12/08* (2013.01); *H04W 12/12* (2013.01); *H04W 88/08* (2013.01)

(58) Field of Classification Search
None
See application file for complete search history.

(56) References Cited

U.S. PATENT DOCUMENTS

| | | |
|---|---|---|
| 2004/0003285 A1 | 1/2004 | Whelan et al. |
| 2005/0141498 A1 | 6/2005 | Cam Winget et al. |
| 2006/0193299 A1* | 8/2006 | Winget et al. ................. 370/338 |
| 2006/0200862 A1 | 9/2006 | Olson et al. |
| 2007/0286143 A1* | 12/2007 | Olson et al. ................... 370/338 |
| 2008/0186932 A1 | 8/2008 | Do et al. |
| 2009/0271864 A1* | 10/2009 | Dietrich et al. ................. 726/23 |
| 2010/0290396 A1* | 11/2010 | Karunakaran et al. ........ 370/328 |
| 2012/0124665 A1* | 5/2012 | Dubey et al. .................... 726/22 |
| 2014/0283029 A1* | 9/2014 | Chandrasekaran et al. .... 726/22 |

OTHER PUBLICATIONS

GB Search Report cited in corresponding Application No. GB1322640.2 on Apr. 15, 2014.

* cited by examiner

*Primary Examiner* — Edan Orgad
*Assistant Examiner* — Sithu Ko

(57) ABSTRACT

Methods, systems and computer readable media for rogue access point detection are disclosed. In some implementations, the method can include initiating, at one or more processors of a wireless controller, a rogue access point detection process for a wireless network, and transmitting, from the one or more processors, a signature frame to a mobility agent in a wireless switch. The method can also include receiving, at an authorized access point, the signature frame transmitted via a wireless signal from a rogue access point. The method can further include reporting reception of the signature frame to the wireless controller, and generating, at the one or more processors, a signal to shut down a port associated with the rogue access point.

20 Claims, 4 Drawing Sheets

ROGUE AP DETECTION

TECHNICAL FIELD

Embodiments relate generally to computer networks, and more particularly, to methods, systems and computer readable media for detection of rogue or unauthorized access points (APs).

BACKGROUND

In wireless networks, an overlay deployment model is commonly used. The overlay deployment model co-locates wireless control plane (WCP) functions and wireless switching plane (WSP) functions in a single device called a WC. In contrast to overlay deployment, a split-plane architecture decouples WCP functions from WSP functions into separate devices.

WCP functions can be implemented in a virtual appliance or on actual hardware. A device that implements only the WCP is called a wireless control point (WCP). WCP functions can be integrated into a switch (e.g., a stackable or core switches). WSP functions can also be provided on WCP-managed WSPs.

Distributed forwarding is a special case of the split-plane deployment model with WSP function residing on the AP itself. Each AP can establish a mobility tunnel with all other APs in the mobility domain. Each AP can be configured to release traffic to the wired network locally if the wireless client is on a VLAN that is accessible to the AP. APs can forward traffic over the data tunnel to another AP when it does not have access to the client's VLAN on its physical port. The AP to which traffic is forwarded should provide access to the client's VLAN.

In centralized forwarding, WSP functions reside outside the AP. The APs forward traffic to the device that implements the WSP function. The overlay deployment model is an example of centralized forwarding.

Embodiments were conceived in light of the above mentioned needs, problems and/or limitations, among other things.

SUMMARY

One or more embodiments can include methods, systems and computer readable media for rogue access point detection are disclosed. In some implementations, the method can include initiating, at one or more processors of a wireless controller, a rogue access point detection process for a wireless network, and transmitting, from the one or more processors, a signature frame to a mobility agent (MA) in a wireless switch. The wireless controller instructs the mobility agent residing in the WSP to inject a signature frame. The mobility agent, upon receiving this instruction, constructs the signature frame. The frame, apart from other fields, includes the switch identifier, and the port/VLAN from which the frame is being sent. The agent then sends this frame out on all the ports/VLANS in the switch. The method can also include receiving, at an authorized access point, the signature frame transmitted via a wireless signal from a rogue access point. The method can further include reporting reception of the signature frame to the wireless controller, and generating, at the one or more processors, a signal to shut down a port associated with the rogue access point.

The wireless network can include a split-plane architecture. The wireless controller can communicate with the wireless switch via mobility control protocol. A wireless intrusion detection component of the wireless controller can be adapted to gather information regarding connected devices on different physical ports of the wireless switch.

In some implementations, the transmitting and receiving is coordinated between the access point and the wireless switch in a top-down configuration in which the wireless controller directs the wireless switch and the access point to inject the signature frame and monitor for reception of the signature frame. In other implementations, the transmitting and receiving is coordinated between the access point and the wireless switch in a peer-to-peer approach in which the wireless controller directs the wireless switch and the access point to exchange control messages directly between each other.

DETAILED DESCRIPTION

Figure 1:
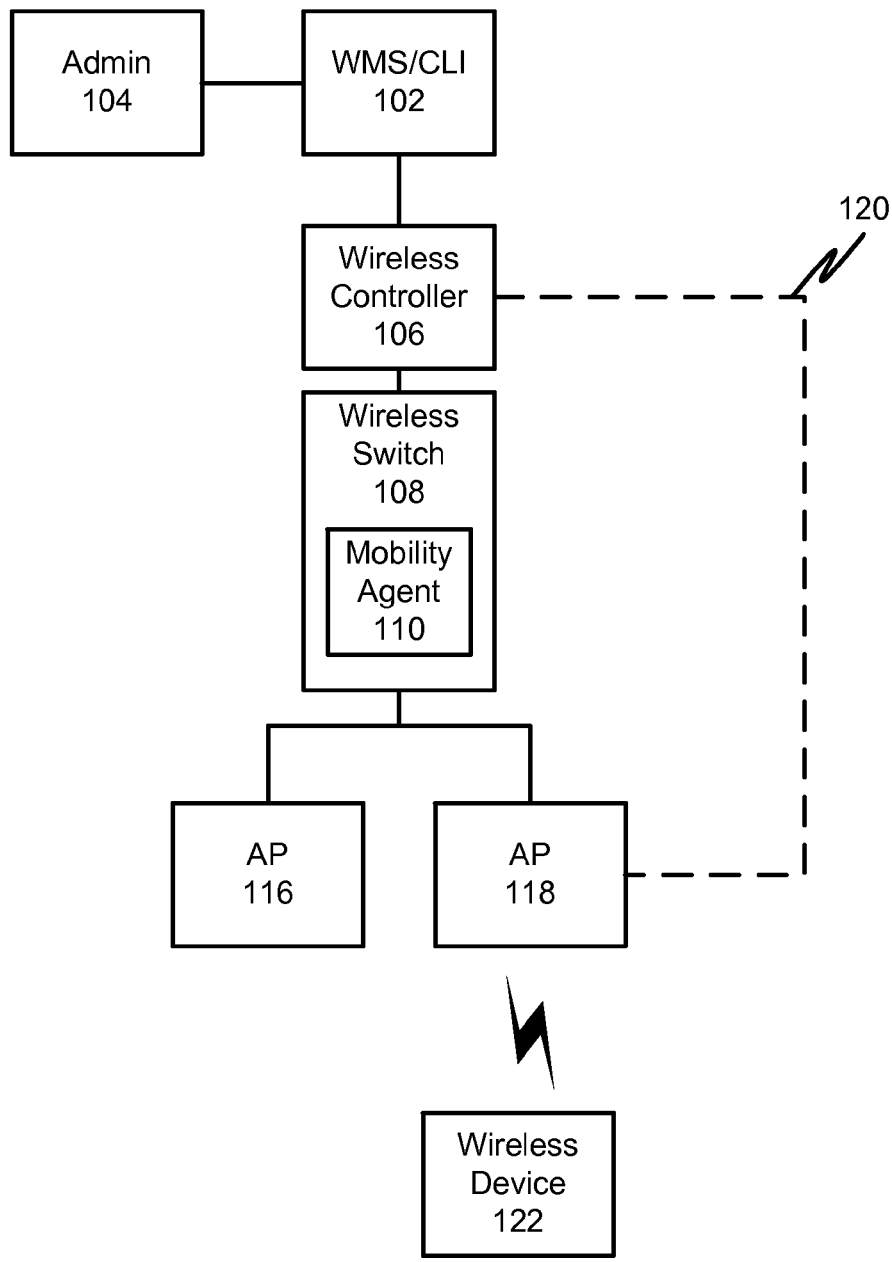
FIG. 1 is a diagram of an example network in accordance with at least one implementation.

Wireless networks (e.g., enterprise WLANs) may deploy wireless intrusion detections and prevention systems (WIDS/WIPS) to monitor the RF spectrum to detect and classify rogue access points (e.g., unauthorized access points). The WIDS/WIPS can be deployed as an overlay dedicated appliance with its own dedicated "sensor" APs, or as an integrated component of a wireless controller with the managed APs doubling up as "sensors."

The sensor APs may scan the air and report all APs in the neighborhood to WIDS to create an RF scan database. The WIDS can then walk through this database to determine and classify which of the detected APs are locally managed by the enterprise WLAN (i.e., legal or authorized APs), known APs managed by a neighboring enterprise (neighbor APs), or rogue APs that are not authorized to be connected to the corporate LAN.

One way to detect rogue APs is to inject a "signature frame" into the wired network and watch for it to appear in the wireless network. This approach can reveal the AP that acted as a bridge between the wired and wireless networks and that AP can then be classified as rogue by the WIDS.

In some conventional approaches, in order to inject the signature frames in the wired network, there must be devices distributed throughout the corporate LAN. These devices receive instructions from the WIDS management component to inject frames into the LAN. These devices may be APs that inject frames into their wired port and listen for them on their wireless radios. In some instances, an AP may be reconfigured to simply inject frames and scan traffic in various parts of the wired network.

Once an AP is classified as rogue, the WIDS will typically attempt to determine the physical switch port where the rogue AP is connected through one or more of manual configuration, scanning of MIBs in the switches, and using a service oriented API exposed by the management system. Then, the WIDS will typically attempt to disconnect the rogue AP from the LAN via one or more of raising a trap and expecting a network administrator to manually shut down the port or using a service oriented API exposed by the management system to shut down the port.

Some of the existing approaches may suffer from one or more problems or limitations. For example, the frame injection or sensing devices must have access to all VLANs on the wired LAN where rogue APs can be attached by a user (either malicious or unintentional). Thus, every physical port on every switch where the AP connects must be provisioned manually for access to those VLANs. Also, additional APs (or sensors) or other dedicated devices may need to be deployed in areas which cannot be addressed or accessed by the APs. The provisioning problem can remain for these devices as well.

In the conventional approaches, the response to a detected and classified rogue AP can be slow depending on the method. In order to respond to a threat in the conventional systems, many separate systems must interwork properly. Further, multiple systems increase the cost of provisioning and maintenance.

Access points (APs) are WCP-managed devices and do not provide standard management interfaces such as console, telnet/SSH, SNMP and/or HTTP for device configuration. APs discover the WCP using a discovery protocol and establish a control channel with the WCP device. Configuration for the APs is defined on the WCP and pushed to each AP when the AP associates with the WCP over the control channel. For example, AP profiles are used to define AP configuration on the WCP.

A WCP-managed device applies the received configuration from the WCP with which it has associated. Each AP reports monitoring information to the WCP with which it has associated.

WSPs can be partially managed by the WCP. Each WSP discovers the WCP and establishes a control channel with the WCP. WSPs receive mobility VLAN configuration and state from the managing WCP.

In general, a rogue AP detection system or method can include using split-plane architecture and the MCP protocol to permit a wireless network to approach the rogue AP problem in a simple and effective manner. Mobility agents (MAs) on wireless switches are already in communication with the wireless controller which hosts the WIDS components.

Whenever rogue AP detection is required, the WIDS can communicate with any wireless switch in the network via MCP and send instructions to transmit signature frames in whichever VLAN or port or VLAN/port combination may be needed. The WIDS components can also gather information regarding connected devices on different physical ports of wireless switches to enhance rogue AP classification algorithms. For example, a wireless controller can instruct a mobility agent residing in the WSP to inject a signature frame. The mobility agent, upon receiving this instruction, constructs the signature frame. The frame, apart from other fields, can include the switch identifier, and the port/VLAN from which the frame is being sent. The agent then sends this frame out on all the ports/VLANS in the switch.

Further, signature message injection and scanning can be coordinated between sensor APs and wireless switches using one of a top-down approach where the WCP directs both devices to inject and scan, or using a peer-to-peer approach where the WCP directs both devices to exchange control messages directly between each other using enhancements to the MVMP protocol.

FIG. 1 is a diagram of an example network 100. The network 100 includes a WMS (including a web/CLI interface) 102, which can be accessed by a network administrator 104.

The network 100 also includes a wireless controller 106 and a wireless switch 108 having a mobility agent 110. The network 100 can also include a plurality of wireless access points (APs) 116-118 that can provide access to one or more wireless devices 122. An AP control channel 120 can connect the APs 116-118 to the wireless controller 108.

Figure 2:
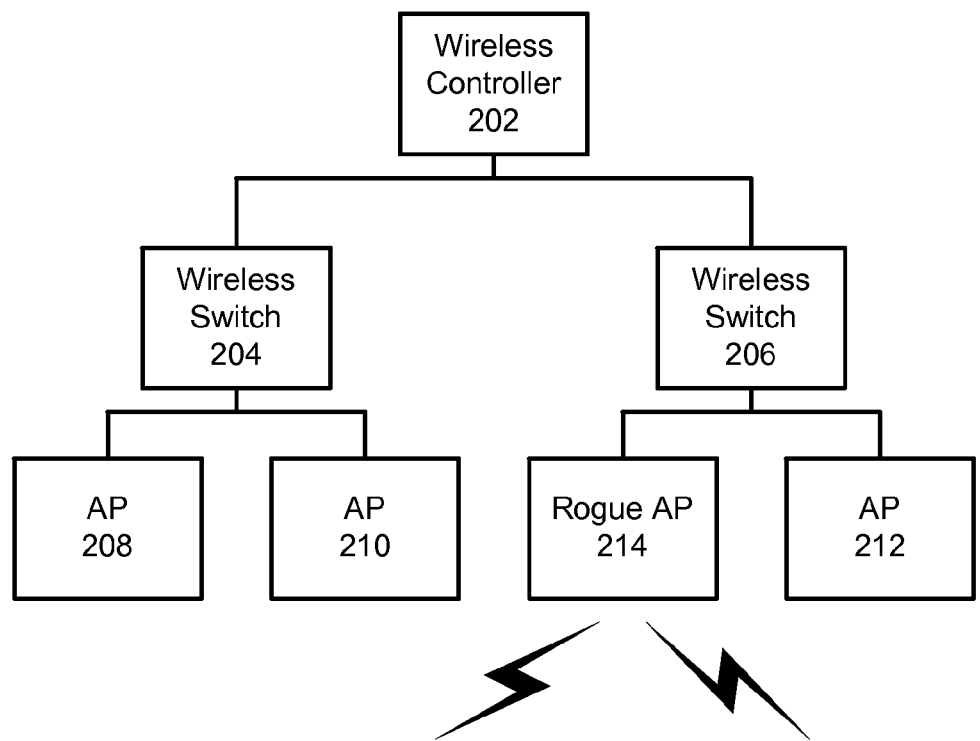
FIG. 2 is a diagram of an example network showing a rogue AP detection system in accordance with at least one implementation.

FIG. 2 is a diagram of an example network 200 showing a rogue AP detection system. The network 200 includes a wireless controller 202, a plurality of wireless switches (or wireless switch/mobility agents) (204-206), a plurality of authorized APs (208-212) and a rogue AP 214.

Figure 3:
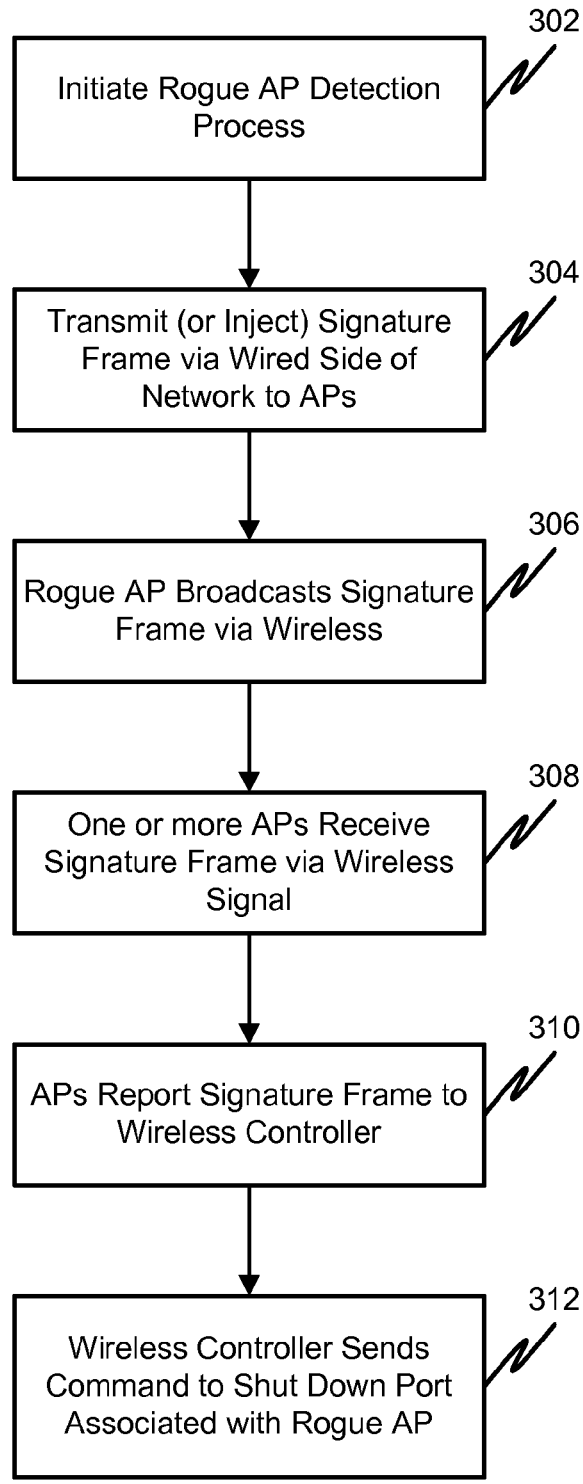
FIG. 3 is a flow chart of an example method for rogue AP detection in accordance with at least one implementation.

FIG. 3 is a flow chart of an example method 300 for rogue AP detection. Processing begins at 302, where a rogue AP detection process is initiated (e.g., at the wireless controller 202). The process can be initiated automatically and/or manually. Processing continues to 304.

At 304, a signature frame is transmitted. For example, a signature frame can be transmitted from a mobility agent in a wireless switch (e.g., 204 and/or 206) to the APs associated with each switch. The signature frame contains a pattern of data that is known to the authorized APs, which are configured to not bridge the signature frame to the air (e.g., transmit the signature frame via a wireless interface). For example, the Mobility Agent can include the switch, port and VLAN identifiers in the signature frame that is sent out. This helps the WC to isolate and shutdown the port(s) to which rogue APs are connected. Processing continues to 306.

At 306, the signature frame is bridged to the air by the rogue AP (e.g., 214). Because the rogue AP has not been configured to recognize the signature frame, the rogue AP will not prevent the signature frame from being transmitted wirelessly. Processing continues to 308.

At 308, one or more authorized APs (e.g., 210 and/or 212) may receive the signature frame that has been transmitted wirelessly by the rogue AP and report the detection of the signature frame to the wireless controller. Processing continues to 310.

At 310, the authorized APs report detecting the signature frame to the wireless controller. Processing continues to 312.

At 312, the wireless controller can send a command to disable (or shut down) the port associated with the rogue AP.

It will be appreciated that 302-312 can be repeated in whole or in part in order to accomplish a rogue AP detection task.

The systems and methods for rogue AP detection described herein can provide rogue AP detection without a need for any additional devices or integration with management systems due to the wireless LAN being accessible to the WIDS component through MCP and MA. Also, there is no need for per-port VLAN provisioning because the MA can integrate directly with the L2/L3 protocols of the wireless switch, which allows the wireless switch to transmit the signature frame through any port/VLAN.

In some implementations, signature frames can encode additional information such as wireless switch identification and physical port identification to more rapidly determine where a rogue AP is connected.

Once an AP is classified as rogue, WIDS components can quickly and directly communicate with the appropriate MA to instruct the MA to shut down the port to which the rogue AP is connected instead of going through a network management module or involving a manual operation. Thus, the accuracy and speed of rogue AP detection, classification and isolation can be improved.

Figure 4:
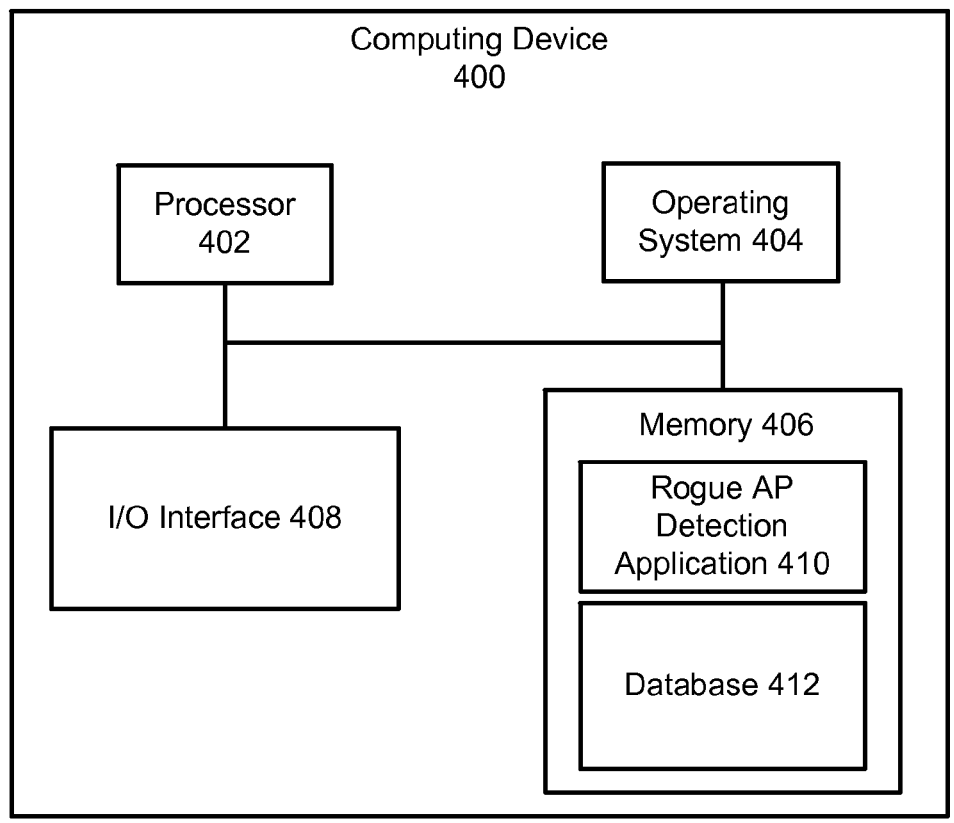
FIG. 4 is a diagram of an example computer system for rogue AP detection in accordance with at least one implementation.

FIG. 4 is a diagram of an example computer system 400 in accordance with at least one implementation. The computer 400 includes a processor 402, operating system 404, memory 406 and I/O interface 408. The memory 406 can include a rogue AP detection application 410 and a database 412 (e.g., for storing detection signatures or the like).

In operation, the processor 402 may execute the application 410 stored in the memory 406. The application 410 can include software instructions that, when executed by the processor, cause the processor to perform operations for network management in accordance with the present disclosure (e.g., performing one or more of steps 302-312).

The application program 410 can operate in conjunction with the database 412 and the operating system 404.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for rogue AP detection.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   initiating, at one or more processors of a wireless controller, a rogue access point detection process for a wireless network;
   transmitting, from the one or more processors, a signature frame to a mobility agent in a wireless switch;
   constructing the signature frame, by the mobility agent in the wireless switch, to include a switch identifier, a port identifier and a VLAN identifier in the signature frame;
   transmitting, by the mobility agent in the wireless switch, the signature frame, to one or more access points in the wireless network;
   receiving, at an authorized access point, the signature frame transmitted via a wireless signal from a rogue access point;
   reporting reception of the signature frame to the wireless controller; and
   generating, at the one or more processors, a signal to shut down a port associated with the rogue access point.

2. The method of claim 1, wherein the wireless network includes a split-plane architecture.

3. The method of claim 1, wherein the wireless controller communicates with the wireless switch via mobility control protocol.

4. The method of claim 1, wherein a wireless intrusion detection component of the wireless controller is adapted to gather information regarding connected devices on different physical ports of the wireless switch.

5. A system comprising one or more processors configured to perform operations including:
 initiating, at a wireless controller, a rogue access point detection process for a network;
 transmitting a signature frame to a mobility agent in a wireless switch via a wired portion of the network;
 constructing the signature frame, by the mobility agent in the wireless switch, to include a switch identifier, a port identifier and a VLAN identifier in the signature frame;
 transmitting, by the mobility agent in the wireless switch, the signature frame, to one or more access points in the wireless network;
 receiving, at an authorized access point, the signature frame transmitted via a wireless signal from a rogue access point;
 reporting reception of the signature frame to the wireless controller; and
 generating a signal to shut down a port associated with the rogue access point.

6. The system of claim 5, wherein the wireless network includes a split-plane architecture.

7. The system of claim 5, wherein the wireless controller communicates with the wireless switch via mobility control protocol.

8. The system of claim 5, wherein a wireless intrusion detection component of the wireless controller is adapted to gather information regarding connected devices on different physical ports of the wireless switch.

9. The system of claim 5, wherein the transmitting and receiving is coordinated between the access point and the wireless switch in a top-down configuration in which the wireless controller directs the wireless switch and the access point to inject the signature frame and monitor for reception of the signature frame.

10. The system of claim 5, wherein the transmitting and receiving is coordinated between the access point and the wireless switch in a peer-to-peer approach in which the wireless controller directs the wireless switch and the access point to exchange control messages directly between each other.

11. A nontransitory computer readable medium having stored thereon software instructions that, when executed by a processor of a wireless controller, cause the processor to perform operations including:
 initiating a rogue access point detection process for a network;
 transmitting a signature frame to a mobility agent in a wireless switch via a wired portion of the network;
 constructing the signature frame, by the mobility agent in the wireless switch, to include a switch identifier, a port identifier and a VLAN identifier in the signature frame;
 transmitting, by the mobility agent in the wireless switch, the signature frame, to one or more access points in the wireless network;
 receiving, at an authorized access point, the signature frame transmitted via a wireless signal from a rogue access point;
 reporting reception of the signature frame to the wireless controller; and
 generating a signal to shut down a port associated with the rogue access point.

12. The nontransitory computer readable medium of claim 11, wherein the wireless network includes a split-plane architecture.

13. The nontransitory computer readable medium of claim 11, wherein the wireless controller communicates with the wireless switch via mobility control protocol.

14. The nontransitory computer readable medium of claim 11, wherein a wireless intrusion detection component of the wireless controller is adapted to gather information regarding connected devices on different physical ports of the wireless switch.

15. The nontransitory computer readable medium of claim 11, wherein the transmitting and receiving is coordinated between the access point and the wireless switch in a top-down configuration in which the wireless controller directs the wireless switch and the access point to inject the signature frame and monitor for reception of the signature frame.

16. The nontransitory computer readable medium of claim 11, wherein the transmitting and receiving is coordinated between the access point and the wireless switch in a peer-to-peer approach in which the wireless controller directs the wireless switch and the access point to exchange control messages directly between each other.

17. The method of claim 1, further comprising:
 receiving at the authorized access point the signature frame transmitted by the mobility identifier in the wireless switch; and
 preventing transmission of the signature frame from a wireless interface of the authorized access point.

18. The method of claim 17, wherein preventing transmission of the signature frame comprises recognizing the signature frame based on a pattern of data in the signature frame.

19. The system of claim 5, wherein the one or more processors are further configured to perform operations including:
 receiving at the authorized access point the signature frame transmitted by the mobility identifier in the wireless switch; and
 preventing transmission of the signature frame from a wireless interface of the authorized access point.

20. The system of claim 19, wherein the one or more processors are configured to prevent transmission of the signature frame from the wireless interface of the authorized access point by recognizing the signature frame based on a pattern of data in the signature frame.

* * * * *